E. W. JENKINS.
SPRING WHEEL.
APPLICATION FILED JUNE 6, 1910.

974,155.

Patented Nov. 1, 1910
2 SHEETS—SHEET 1.

Witnesses:
A. R. Walton
E. F. Camp

Inventor
Edson W. Jenkins
By
Attys

THE NORRIS PETERS CO., WASHINGTON, D. C.

E. W. JENKINS.
SPRING WHEEL.
APPLICATION FILED JUNE 6, 1910.

974,155.

Patented Nov. 1, 1910

2 SHEETS—SHEET 2.

Witnesses.
A. R. Walton
E. F. Camp

Inventor
Edson W. Jenkins
By Miles S. _____
Atty.

UNITED STATES PATENT OFFICE.

EDSON W. JENKINS, OF ALFRED STATION, NEW YORK, ASSIGNOR OF ONE-HALF TO CHARLES M. HAYES, OF HORNELL, NEW YORK.

SPRING-WHEEL.

974,155.  Specification of Letters Patent.  Patented Nov. 1, 1910.

Application filed June 6, 1910. Serial No. 565,243.

*To all whom it may concern:*

Be it known that I, EDSON W. JENKINS, citizen of the United States, residing at Alfred Station, R. F. D. 1, in the county of Allegany and State of New York, have invented certain new and useful Improvements in Spring-Wheels, of which the following is a specification.

My present invention relates to spring wheels, especially for use on automobiles, bicycles, and the like, my object being to provide certain novel details whereby to structurally improve the present devices. Therefore, with this in mind, my invention resides in certain details shown in the accompanying drawings, in which—

Figure 1:
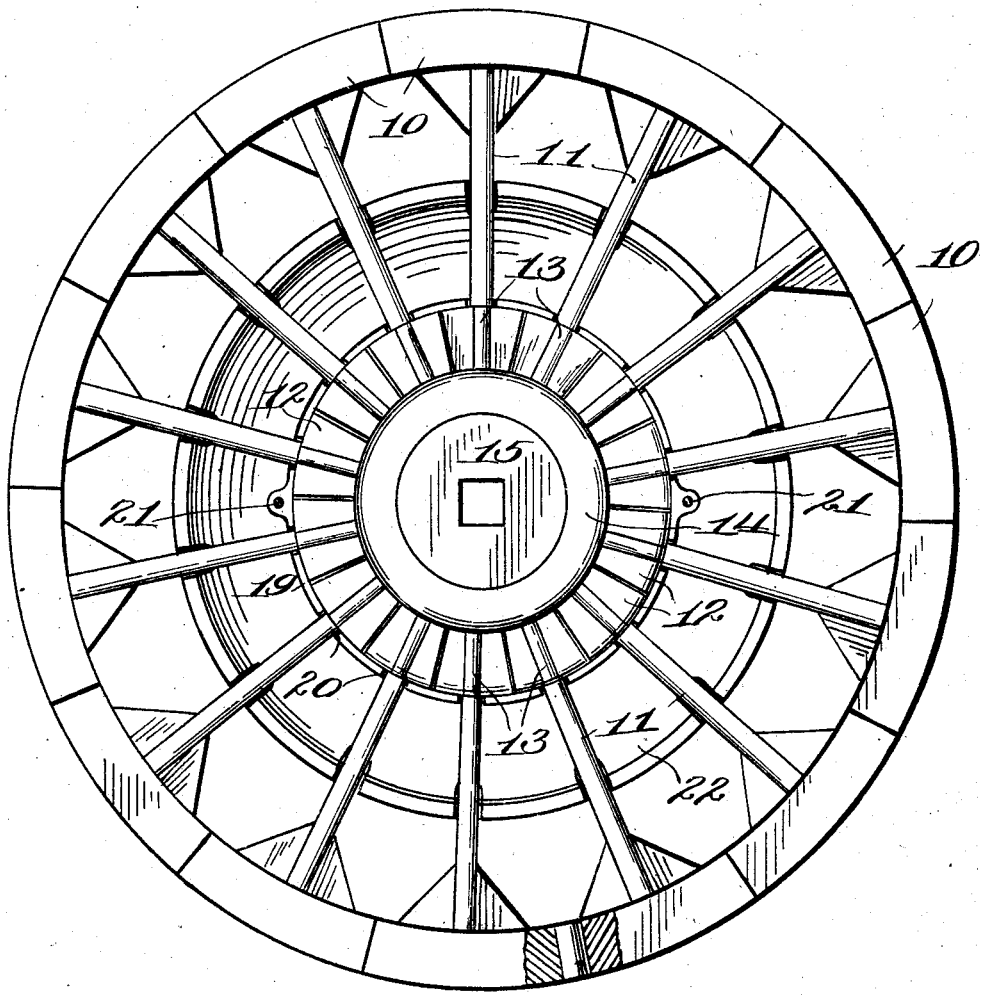
Figure 2:
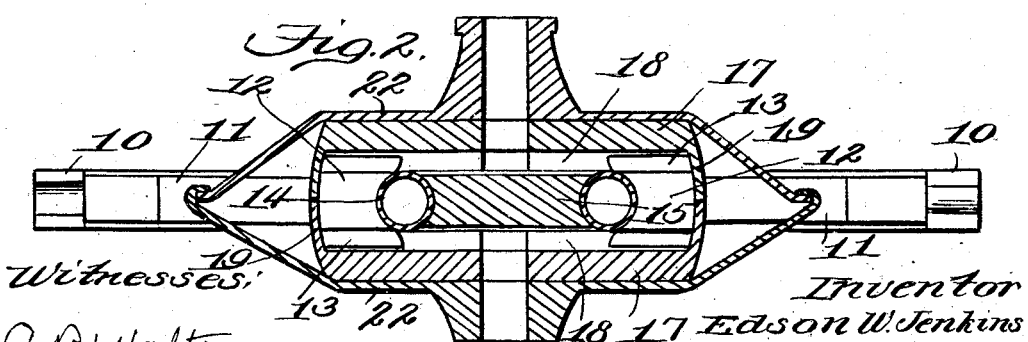
Figure 3:
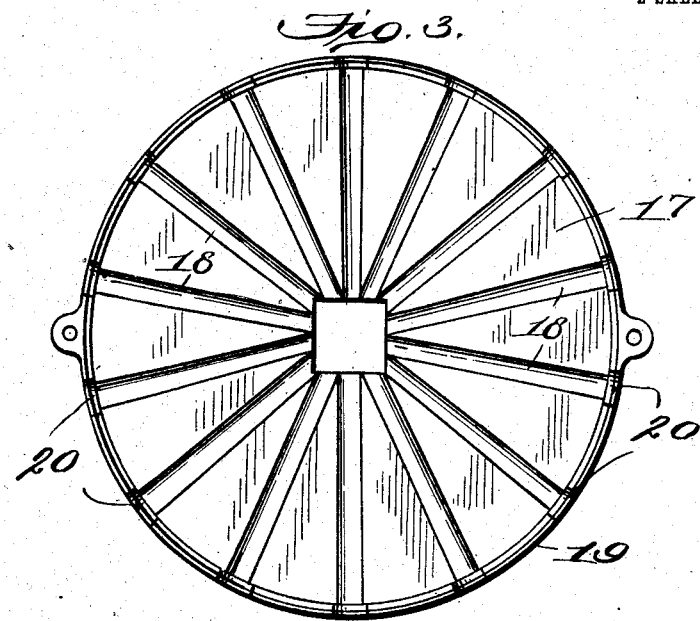

Figure 1 is a side elevation of the wheel with one of the side plates and hub plates removed. Fig. 2 is a cross-section therethrough. Fig. 3 is an inner face view of one of the hub plates, and Fig. 4 is a side view of the hub, illustrating a slightly modified form.

Referring now to these figures, the wheel rim is composed of a number of segmental sections 10, each of which has a transverse recess at one end and a transverse projection at its opposite end, these recesses and projections slidably engaging throughout the series so that the sections 10 may all have radial movement. Each of the sections 10 has, secured centrally thereto, the outer end of a spoke 11, the inner end of which is provided with a squared enlargement 12. These inner enlargements 12, of the spokes 11, have smooth flat contiguous faces and have their opposite side faces provided with outstanding ribs 13 in line with the spokes 11, the inner ends of said enlargements being concaved, as shown in Figs. 1 and 2, to fit snugly against the periphery of the pneumatic tire 14 disposed around the circular grooved periphery of the hub 15, which is solid and has a central bore for the reception of an axle.

Figure 4:
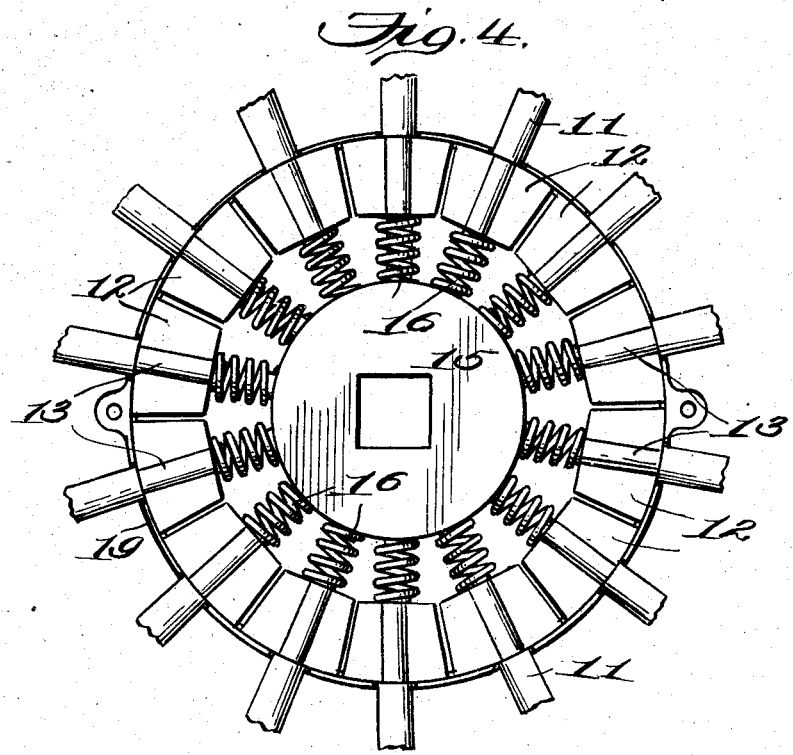

As shown in Fig. 4, the inner ends of the spoke enlargements 12, are square and flat and abut against coiled springs 16 disposed radially upon the periphery of the hub 23, one spring to each spoke.

Fitting upon opposite sides of the hub 15, are hub plates 17, having central bores and series of radial grooves 18 in their inner faces, to receive the ribs 13 of the spoke enlargements, these plates having circular side flanges 19 at their peripheries, extending toward one another, the edges of said flanges abutting beyond the spoke enlargements and having series of coincident recesses 20 forming openings through which the spokes 11 extend. These hub plates are secured together by means of fastening members 21. Outside the hub plates 17, are a pair of side plates 22, forming, together, a dust and dirt excluding casing, these side plates having central bores similar to those of the hub 23 and plates 17, and being provided with interlockingly bent peripheral edges between the spokes 11, and coincident recesses forming openings through which said spokes project. From this it will be seen that the casing formed by the side plates 22, also constitutes a guide for the spokes and serves to assist the hub plates 17 to support the same in such manner that they may freely move in a radial direction against the internal spring means carried by the hub. The rim may, of course, have a suitable tire.

I claim:

The combination of a rim comprising a series of relatively movable sections, of spokes carried by said sections, having squared enlargements at their inner ends provided with ribs upon opposite faces, a hub having elastic means around its periphery to receive the inner ends of said spokes, hub plates disposed upon opposite sides of said hub and having radial grooves upon their inner surfaces to receive said spoke ribs, and provided with abutting, peripheral side flanges beyond the spoke enlargements, having coincident recesses forming openings through which the spokes project, and means to connect said hub plates together.

In testimony whereof I affix my signature in presence of two witnesses.

EDSON W. JENKINS.

Witnesses:
EDSON E. JENKINS,
HERMAN E. BUCK.